United States Patent [19]
Underwood

[11] 3,734,437
[45] May 22, 1973

[54] TELESCOPE MOUNTING FOR GUNS

[76] Inventor: Ralph H. Underwood, 6825 S. Pennsylvania St., Littleton, Colo. 80121

[22] Filed: June 24, 1971

[21] Appl. No.: 156,229

[52] U.S. Cl. .................................248/205 R, 33/50 R
[51] Int. Cl. ......................................................F41g 1/38
[58] Field of Search ......................248/205 R, 226 R, 248/229; 33/50 R, 50 A

[56] References Cited

UNITED STATES PATENTS

| | | | |
|---|---|---|---|
| 2,774,142 | 12/1956 | Lake et al. | 33/50 R |
| 960,813 | 6/1910 | Burton | 33/50 R |
| 3,045,351 | 7/1962 | Dayton | 33/50 R |
| 3,187,435 | 6/1965 | Miller | 33/50 R |
| 691,248 | 1/1902 | De Zeng | 33/50 R |
| 2,486,002 | 10/1949 | Buehler | 33/50 R |
| 3,626,597 | 12/1971 | Darrah | 33/50 R |
| 3,401,460 | 9/1968 | Tellie | 33/50 R |
| 2,911,723 | 11/1959 | Ashbrook | 33/50 R |

*Primary Examiner*—J. Franklin Foss
*Attorney*—Bertha L. MacGregor

[57] ABSTRACT

Telescope mounting for guns which comprises a pair of rigid half ring members designed to embrace and surround a telescope, said rigid half ring members being provided with arcuate recesses on their inner surfaces for reception of a ring member which may be a split full ring or a partial ring which extends across the meeting edges of the pair of rigid half rings, characterized by the absence of protruding or externally exposed fastening means.

5 Claims, 9 Drawing Figures

PATENTED MAY 22 1973  3,734,437
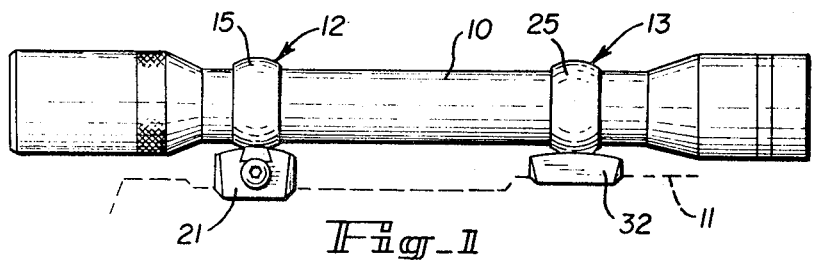
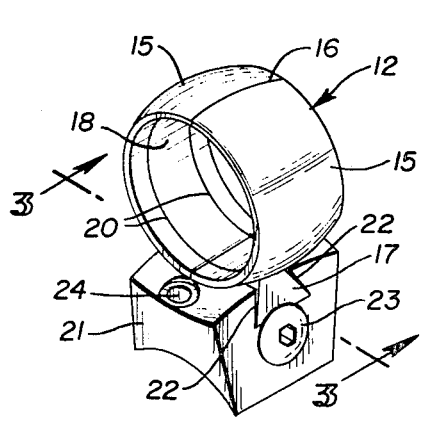
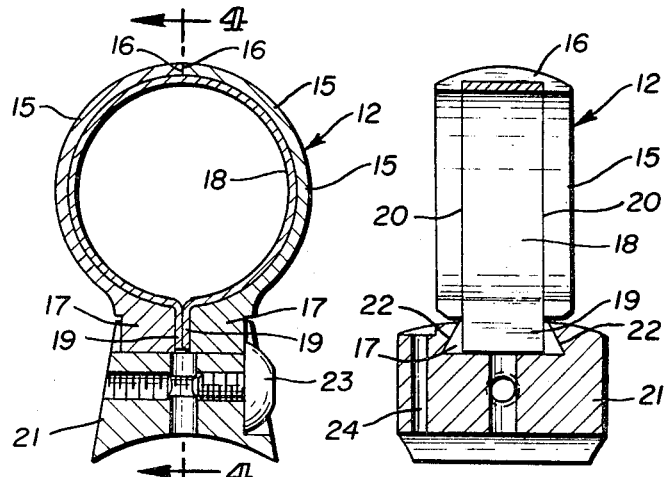
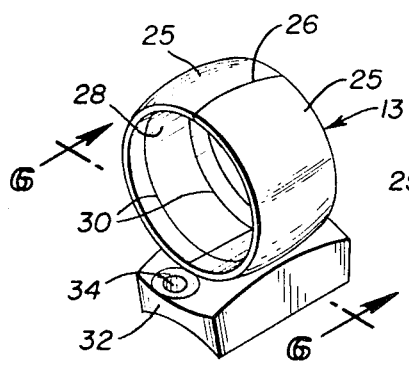
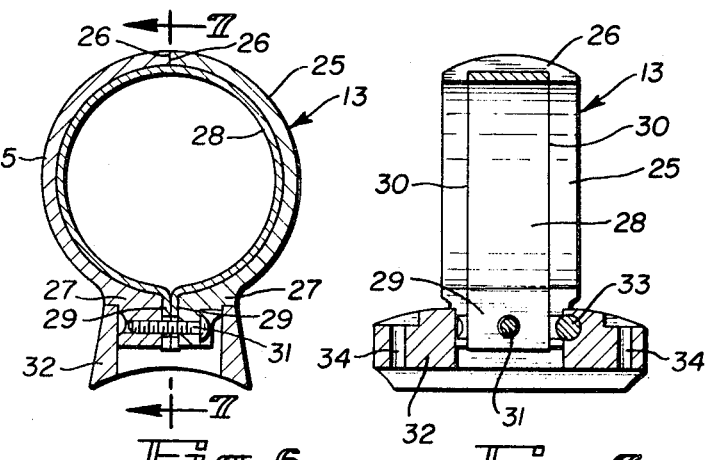
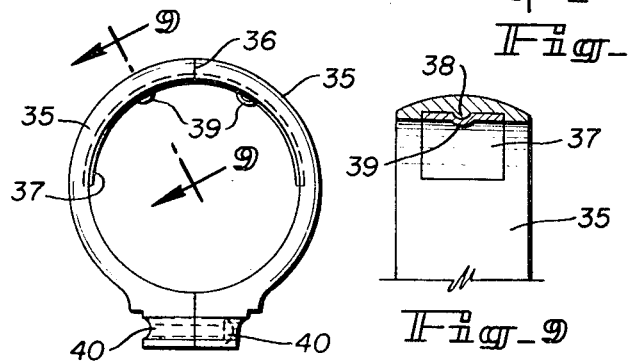
INVENTOR.
RALPH H. UNDERWOOD
BY
Bertha L. MacGregor
ATTORNEY

TELESCOPE MOUNTING FOR GUNS

This invention relates to telescope mountings for guns. The invention is embodied in both rear and front mounts comprising telescope-embracing ring members provided with bases for fastening to a gun.

Prior art telescope mounting means comprise two part rigid ring members provided with projecting ears, usually two pairs, which are fastened together by screws and the like extending therethrough after the two part ring has been placed around the telescope. Such radially projecting ears and their fastening means are unsightly and require manipulation for tightening the ring members around the telescope. The prior art also includes a one piece split ring member made of material sufficiently flexible to permit placement thereof around a telescope, but the holding efficiency of such flexible ring member lacks the stability of rigid members made of steel and the like.

The object of my invention is to provide a two part rigid ring member designed to embrace and surround a telescope, comprising a pair of half rings of rigid metal, such as steel and the like, and a relatively thin inner ring member which may be a full or partial ring mounted in arcuate recesses in the interior surfaces of the pair of rigid half rings, said inner member extending across the meeting edges of the two rigid half rings. In one embodiment of the invention the said ring member is a flexible split full ring which terminates in two parallel depending ends held together in the base of the mount. In another embodiment of the invention the said inner ring is a partial ring provided with engaging means complemental to cooperating means on the interior of the two rigid half rings and also extending across the meeting edges of the two rigid half rings. The partial ring member need not be flexible.

The rigid half rings in both embodiments of my invention are provided with arcuate recesses on their inner surfaces for reception of either a split ring or a partial flexible ring member which extends across the meeting edges of the pair of rigid half rings and retains said rigid half rings in their assembled relationship without the aid of externally exposed fastening means.

In the drawings:

FIG. 1 is an elevational side view of a telescope and of telescope mounting means embodying my invention as they appear when mounted on a gun, indicated in broken lines.

FIG. 2 is an isometric view of the rear mount embodying my invention.

FIG. 3 is a vertical transverse sectional view in the plane of the line 3—3 of FIG. 2.

FIG. 4 is a vertical sectional view in the plane of the line 4—4 of FIG. 3.

FIG. 5 is an isometric view of the front mount embodying my invention.

FIG. 6 is a vertical transverse sectional view in the plane of the line 6—6 of FIG. 5.

FIG. 7 is a vertical sectional view in the plane of the line 7—7 of FIG. 6.

FIG. 8 is an elevational side view of a modified form of construction which may be substituted for the ring portion of either the front or rear mount of my invention.

FIG. 9 is a sectional view in the plane of the line 9—9 of FIG. 8.

In the embodiment of the invention shown in the drawings, a conventional telescope 10 is mounted on a gun indicated by the broken lines 11. Telescoping mounting means embodying my invention comprise a rear mount 12 and front mount 13.

The rear mount 12 is shown in detail in FIGS. 2-4, and comprises right and left half-rings 15 of rigid material such as steel, each half-ring 15 terminating in an upper edge which has a flat vertical surface 16 complemental to the corresponding surface 16 of the other half-ring. Each half-ring 15 terminates in a lower tenon member 17 shaped to provide a dove-tail engagement with a mounting base. The tenon members 17 are slightly spaced apart horizontally, when the upper vertical edge surfaces 16 are in contact with each other, to accommodate a thin flexible spring metal ring 18 terminating in depending ends 19, the latter extending downwardly into the space between the tenon member 17, as shown in FIG. 3. The inner arcuate surface of each of the half-rings 15 is recessed to receive the spring metal ring 18, the recess being narrower that the width of the half-ring as indicated by the lines 20 in FIG. 2 which define the side edges of the flexible ring 18 as well as the arcuate edges of the recess in which the ring 18 fits so as to present a flush smooth inner surface for surrounding the telescope 10 when the parts are assembled. 10 when the parts are assembled.

The two rigid half-rings 15 together with the flexible ring 18 and depending ends 19, assembled by fitting the ring 18 into the recesses in the half-rings, form a complete ring provided with depending tenon members 17 engaging the flexible ring ends 19 between them, for insertion into a rear mount base 21 having a transversely extending groove or mortise 22 for reception of the tenons 17. The dovetail fit between the parts 17 and 22 permits lateral adjustment of the ring assembly in the base 21. A bolt 23 is provided for retaining the ring and base assembly, and a bolt hole 24 for use in fastening the base 21 to the gun 11.

Referring to the front mount construction shown in FIGS. 5-7, the two rigid half-rings 25 are similar to the half-rings 15 heretofore described, being provided with upper vertical edge surfaces 26 similar to the edge surfaces 16. The lower ends 27 of the half-rings 25 differ in form from the tenons 17 of the half-rings 15. Said ends 27 cooperate to form a circular, externally threaded lower end for the ring assembly. Each of the half-rings 25 is provided with a recess for reception of a thin flexible spring metal ring 28 which has depending ends 29 extending into the space between the lower ends 27 of the half-rings 25. The recess in the half-rings 25 is defined by the arcuate lines 30 which also define the width of the flexible ring 28 in FIG. 5. The front mount parts 25-29 are assembled as heretofore described in connection with parts 15-19 of the rear mount. The lower ends 27 of the rigid half-rings and the lower ends 29 of the flexible ring are retained by a screw 31 for insertion in a front mount base 32. A dowel pin 33 firmly retains the parts in assembled positions. Bolt holes 34 are provided for fastening the base 32 to the gun 11.

In FIGS. 8 and 9 is shown a modification of the invention which may be embodied in either the rear or front mount. The modification comprises two rigid half-rings 35 provided with the previously described upper end vertical edge surfaces 36, and having lower base-engaging portions which may be of the form described for either front or rear mount bases. Instead of having a recess adapted to receive a full flexible spring metal ring, the half-rings 35 are partially recessed on their inner surfaces, adjacent their complemental end edges 36, for reception of an inner partial or half-ring 37 which extends arcuately across the rigid two half-rings as shown in FIG. 8. The rigid half-rings 35 are provided in the recessed areas with nibs or protrusions 38 for cooperation with apertures or depressions 39 in the part ring 37. In this construction, the ring 37 does not extend downwardly between the lower ends 40 of the rigid-half rings which may be mounted in either a rear or front mount base such as the parts 21 and 32 heretofore described.

The flexible ring members 18 and 28 preferably are made of relatively thin spring steel, dimensioned to fit snugly into the arcuate recesses of the rigid half-rings, and to bridge the complemental meeting edges of the half-rings. To assemble the mounting means on the telescope, the flexible members are placed in positions embracing and surrounding the telescope, then the rigid half rings are placed so that the flexible members fit into the recesses in the rigid half rings and the latter form a complete ring, and then the base is attached to the pair of tenons 17 or the lower portions 27 of the half rings, so complete a rear or a front mount, respectively. The rigid half rings thus form complete rings surrounding the telescope, with smooth inner and outer surfaces, free of protruding or exposed fastening means. The inner rings 18 and 28 must be flexible enough to slip over the scope 10, whereas the partial ring 37 does not have to flex in order to fit partially around the scope.

I claim:

1. Telescope mounting means for guns comprising
   a. a pair of rigid half rings for embracing and surrounding a telescope, said half rings each having an arcuate recess in its inner surface, and said pair of half rings having meeting edges at one end and base engaging means at the other end,
   b. an inner arcuate member which fits into the recesses of said pair of rigid half rings and extends across the meeting edges of said half rings,
   c. cooperating engaging means on the facing surfaces of the rigid half rings and inner arcuate member at opposite sides of said meeting edges of the half rings holding said meeting edges in contact with each other, and
   d. a base provided with means for receiving said base engaging means on the rigid half rings of a pair.

2. The mounting means defined by claim 1, in which the inner arcuate member is a flexible split ring provided with depending parallel ends located between the base engaging means on the rigid half rings.

3. The telescope mounting means defined by claim 1, in which the cooperating engaging means comprise protrusions on the rigid half rings extending into apertures in the inner arcuate member.

4. The telescope mounting means defined by claim 1, in which the telescope engaging surfaces of the rigid half rings and the inner arcuate member are flush with each other.

5. Telescope mounting means for guns comprising
   a. a pair of rigid half rings for surrounding a telescope, each of said half rings having an arcuate recess in its inner surface, said pair of half rings having meeting edges at their upper ends and base engaging means at their lower ends, said half rings being devoid of externally exposed fastening means for holding said meeting edges in contact with each other,
   b. an inner arcuate member which fits into the recesses of said pair of half rings and extends across the meeting edges of said half rings, and terminates in parallel depending end members, and
   c. a base provided with means for receiving said base engaging means on the half rings and said parallel depending end members on the inner arcuate member.

* * * * *